United States Patent [19]
McCulloch et al.

[11] Patent Number: 5,904,404
[45] Date of Patent: May 18, 1999

[54] LATCH ASSIST MECHANISM FOR A FOLDABLE AUTOMOTIVE SEAT

[75] Inventors: Peter McCulloch, Grosse Pointe Woods; Dennis F. Skielnik, St. Clair Shores, both of Mich.

[73] Assignee: Lear Corporation, Southfield, Mich.

[21] Appl. No.: 08/972,377

[22] Filed: Nov. 18, 1997

[51] Int. Cl.⁶ ..................................................... B60N 2/02
[52] U.S. Cl. ..................................... 297/378.12; 297/340
[58] Field of Search ............................. 296/65.1, 65.01, 296/65.09; 297/331, 332, 378.12, 378.1, 340, 322, 316, 118, 129, 125, 341

[56] References Cited

U.S. PATENT DOCUMENTS

| | | |
|---|---|---|
| 2,192,577 | 3/1940 | Jungerman . |
| 4,124,250 | 11/1978 | Weinich ................................. 297/335 |
| 4,186,960 | 2/1980 | Mizelle ..................................... 297/63 |
| 4,194,782 | 3/1980 | Itoh ........................................... 296/65 |
| 4,227,736 | 10/1980 | Lebault et al. . |
| 4,869,541 | 9/1989 | Wainwright ............................. 296/65.1 |
| 4,932,709 | 6/1990 | Wainwright ............................. 296/65.1 |
| 5,328,238 | 7/1994 | Yamazaki . |
| 5,492,386 | 2/1996 | Callum ....................................... 296/64 |
| 5,498,051 | 3/1996 | Sponsler et al. ........................ 296/65.1 |
| 5,588,707 | 12/1996 | Bolsworth et al. . |
| 5,730,496 | 3/1998 | Hashimoto . |

*Primary Examiner*—Milton Nelson, Jr.
*Attorney, Agent, or Firm*—Brooks & Kushman P.C.

[57] ABSTRACT

A seat for rear passengers of an automotive vehicle comprising a seat portion and an upright back support portion, the seat portion being supported by a linkage mechanism on a seat frame which articulates to permit the seat portion to be moved forwardly toward the front of the vehicle without the necessity of tilting and inverting it, whereby the seat portion forms a cargo-carrying platform. The upright back support portion is foldable on the seat portion to form a continuation of the platform. When the seat portion is in a passenger-supporting position, it locks the upright back support portion to the frame. The lock is released as the seat portion articulates towards its cargo-carrying position. An over-center spring acts on the rearward margin of the seat portion and is stressed when the seat portion is moved into its locking position.

6 Claims, 4 Drawing Sheets

LATCH ASSIST MECHANISM FOR A FOLDABLE AUTOMOTIVE SEAT

TECHNICAL FIELD

The invention relates to a rear seat assembly for a vehicle passenger compartment including an articulated seat support.

BACKGROUND OF THE INVENTION

Contemporary mini-van vehicles and sport utility vehicles may be provided with rear seat assemblies for rear passengers in which provision is made for converting the rear seat assembly to a cargo-carrying platform rearward of forward seat assemblies for the vehicle driver and the front seat passenger. An example of an arrangement of this type can be seen by referring to U.S. Pat. No. 4,932,709.

U.S. patent application Ser. No. 08/698,350, entitled "THIRD AUTOMOTIVE SEAT ASSEMBLY FOR AN AUTOMOTIVE VEHICLE", filed Aug. 15, 1996, discloses a rear seat assembly for a mini-van vehicle which comprises a lower seat portion and an upright seat back support portion that are pivotally supported on a seat base secured to the floor structure of the passenger compartment. The seat assembly is capable of carrying passengers when it is in its normal operating mode and is capable of forming an extension of a cargo-carrying platform when it is folded. Application Ser. No. 08/698,350 is assigned to the assignee of the present invention.

The lower seat portion for the rear seat assembly disclosed in application Ser. No. 08/698,350 is supported on a seat base by an articulated linkage that permits the lower seat portion to be moved forward toward the seat assemblies for the vehicle driver and front seat passenger so that the upper surface of the lower seat portion functions as an extension of the cargo-carrying surface. In this respect, the design of the copending application differs from the design of the '709 patent, which provides for a tilting movement of the seat portion about a forward tilt axis to invert the lower seat portion for cargo-carrying purposes.

After the lower seat portion of the design of the copending application is moved forward in this fashion, the seat back support portion may be folded forward, thereby defining an extension of a load-carrying platform generally in the plane of the upper surface of the forwardly positioned lower seat portion.

BRIEF DESCRIPTION OF THE INVENTION

The present invention incorporates certain features that are common to the design of the previously identified copending patent application. It includes, for example, a rear seat assembly that has an articulated linkage mechanism for supporting a lower seat portion of the seat assembly on a seat assembly base that is secured to the floor structure of the passenger compartment. The upright seat back support portion is pivotally connected to the seat assembly base.

Like the design of the previously identified patent application, the lower seat portion of the present invention may be moved by means of its articulated support linkage to a forward position toward the driver and front seat passenger seats. Further, the upright seat back support portion, as in the case of the design of the copending patent application, may be tilted forward when the lower seat portion is in its cargo-carrying position so it may form an extension of the cargo-carrying surface.

It is an objective of the present invention to make provision for locking the seat back support portion in its upright position when the lower seat portion is moved to its passenger-supporting position and for ensuring that both seat assembly portions are securely latched in place. This is accomplished by an interlock mechanism disposed between the rear margin of the lower seat portion and the lower margin of the seat back support portion adjacent a pivot axis for the seat back support portion on the seat frame.

A spring is provided for applying a force on the rearward margin of the lower seat portion as the lower seat portion is moved to its locking or latching position with respect to the upright seat back support portion. The spring establishes a force moment that resists articulated movement of the lower seat portion to the passenger supporting position as the spring is stressed. At the instant the lower seat portion assumes its final passenger supporting position upon completion of the articulated motion provided by the linkage mechanism, the line of action of the spring passes an over-center position. At that instant, the resistance offered by the spring to articulating motion of the lower seat portion is reversed. This reversal in the force moment provided by the spring causes the lower seat portion to snap into its interlocked position, which corresponds to the normal passenger supporting position. This ensures that the seat back support portion will be fully assembled as it is moved toward its passenger supporting position. It further ensures that the seat back support portion will be locked in place at all times when the lower seat portion is adjusted by its articulated linkage in a rearward direction.

The frame of the upright seat back portion has right and left side members, the lower ends of the side members being pivoted to the base. Likewise, the frame of the lower seat portion has side frame members which are formed integrally with a forward frame member. A rear crossbar extends between the frame side members of the lower seat portion.

A latch mechanism at the lower end of the upright frame side members has a locking surface on each upright frame side and a cam surface on the base. The rear crossbar is wedged between the locking surface and the base cam surface as pivotal links connected to lower side frame members and to the base control movement of the lower seat portion from a forward portion to a normal rearward passenger supporting position. This movement of the lower seat portion to the rearward portion is resisted by the yieldable spring force moment.

PARTICULAR DESCRIPTION OF THE INVENTION

Figure 1:
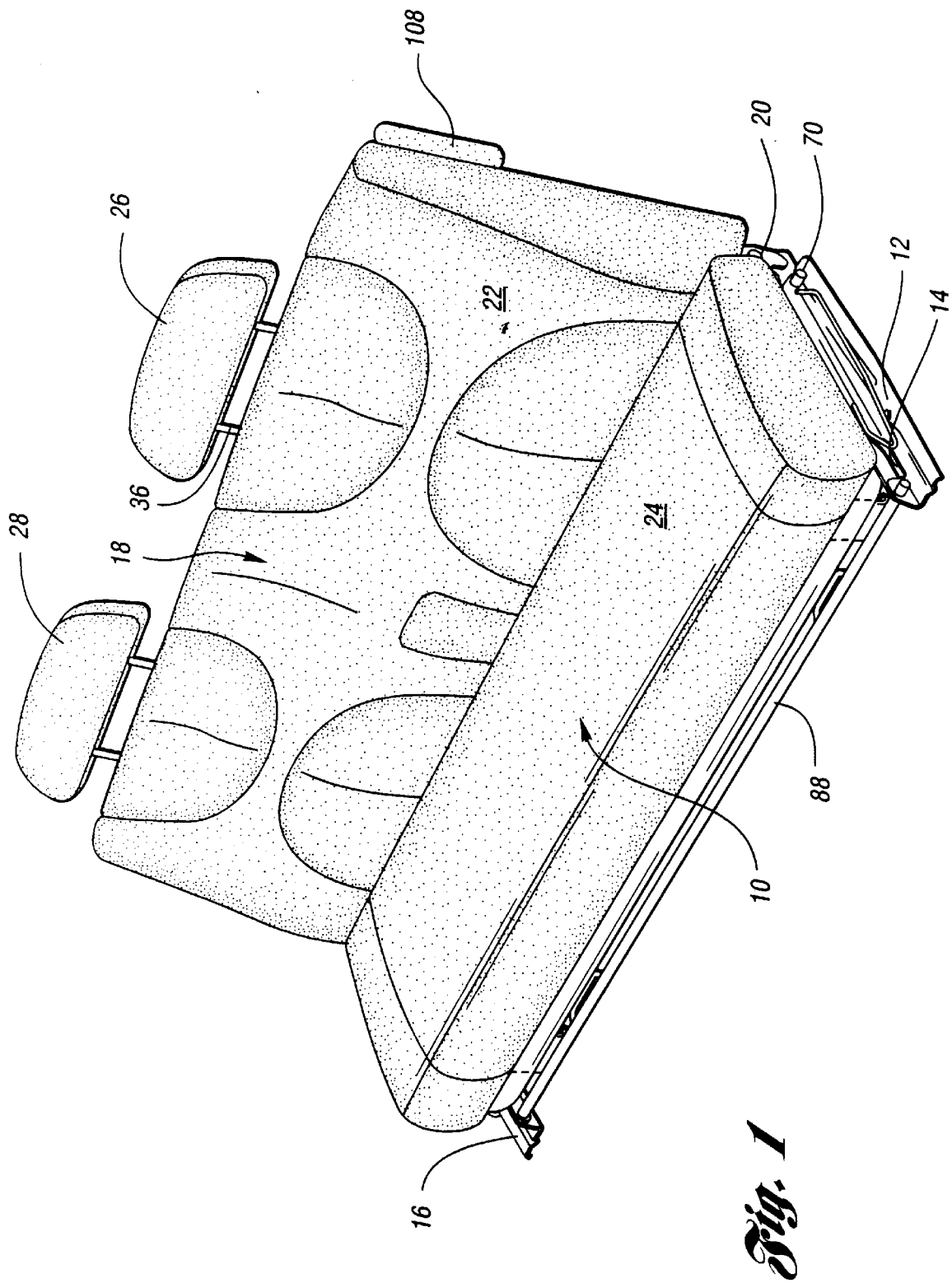
FIG. 1 shows a rear seat assembly with a lower seat portion and an upright seat back support portion mounted on a seat base and with upholstered cushions on the lower seat portion and the upright seat back support portion.

In FIG. 1, numeral 10 generally designates the lower seat portion of a rear seat assembly for an automotive mini-van.

It is supported on a seat base 12 which may be secured to the floor structure of the passenger compartment of the vehicle. The lower seat portion 10 is joined to the base 12 by an articulated linkage generally designated at 14, which will be described with reference to FIGS. 2, 3 and 4.

The lower seat portion 10 extends transversely with respect to a fore-and-aft centerline of the vehicle. The right-hand end of the lower seat portion, which generally is of rectangular configuration, is supported on a base 16, which corresponds to the base 12. An articulated linkage corresponding to the linkage 14 is provided for joining the right-hand end of the lower seat portion to the base 16.

An upright seat back support portion is generally designated by reference numeral 18 in FIG. 1. It is pivoted as shown at 20 to the rear end of the base 12. The right-hand end of the seat back support portion 18 is pivoted to the base 16 in a similar fashion.

The seat back support portion, as well as the lower seat portion, has a structural frame which will be described with reference to FIGS. 2, 3 and 4. Cushioned upholstered material 22, which may include upholstery polyurethane foam, is carried by the upright seat back support portion frame and corresponding cushioned upholstery material 24 is carried by the frame for the lower seat portion 10.

The frame for the upright seat back support portion 18 carries a pair of head restraints 26 and 28.

Figure 2:
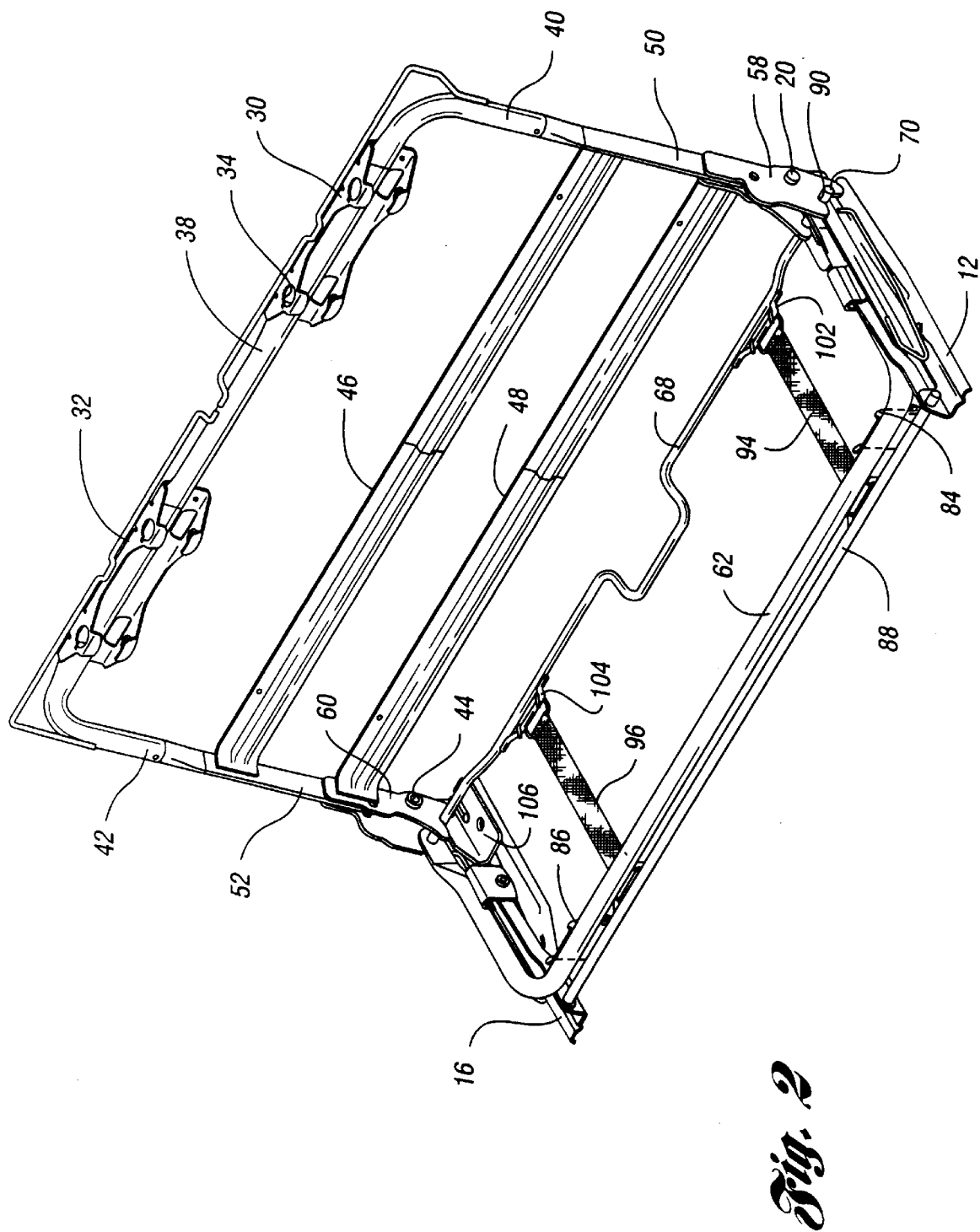
FIG. 2 is a view of the seat assembly frames for the lower seat portion and the upright back support portion shown in FIG. 1.
Figure 3:
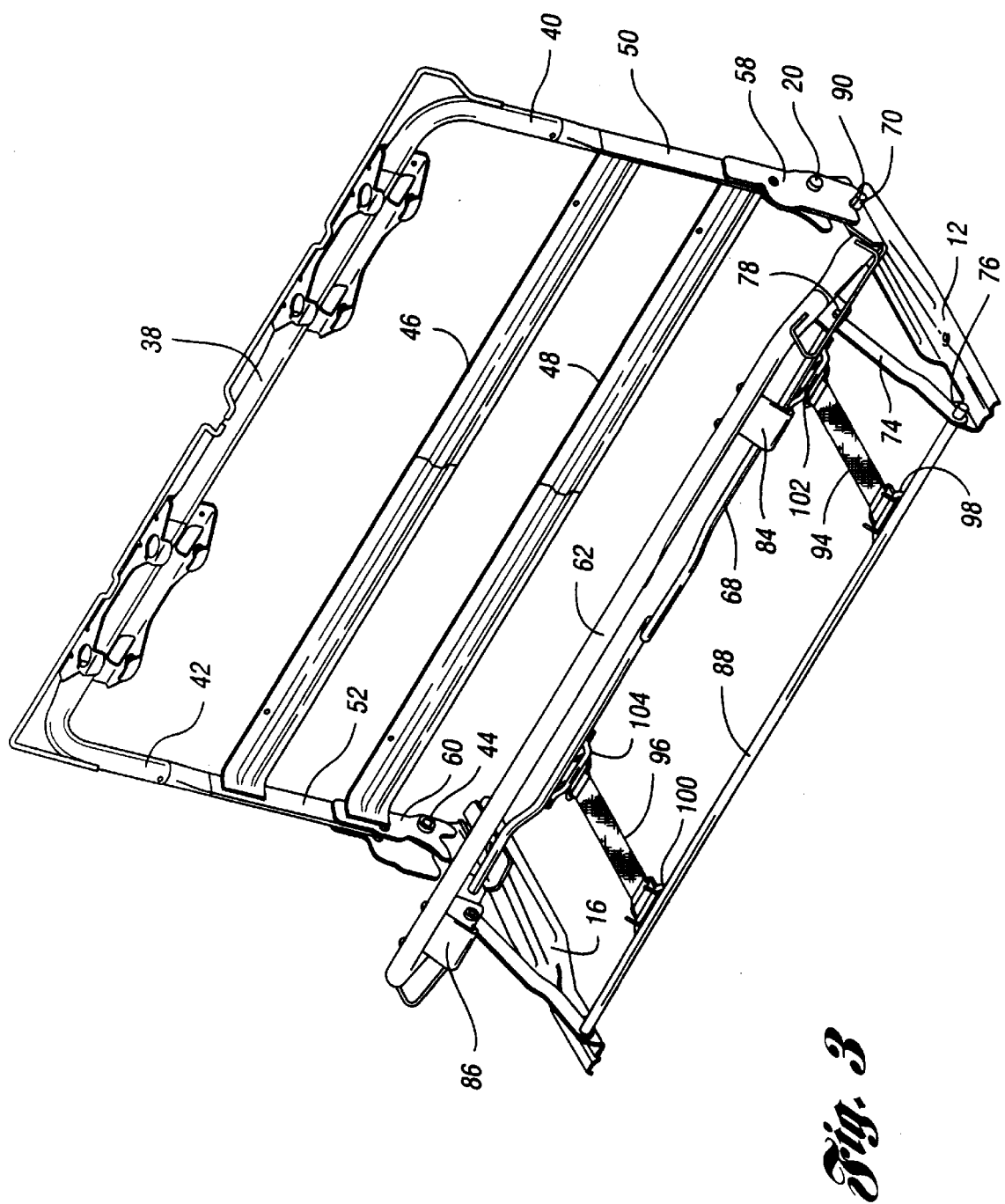
FIG. 3 is a view of the frames for the lower seat portion and the upright seat back support portion when the lower seat portion is partially moved from its cargo-carrying position toward its passenger supporting position.
Figure 4:
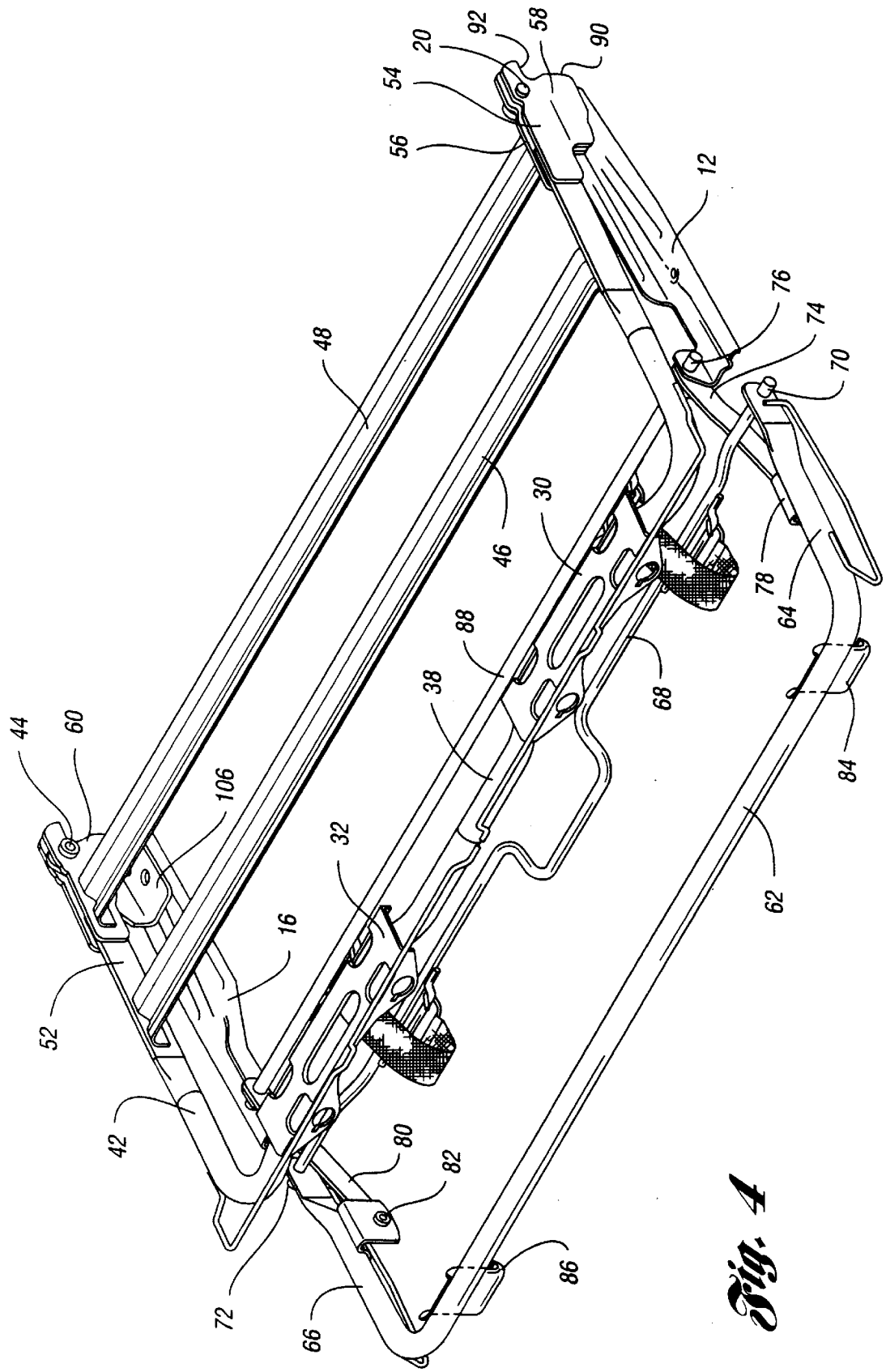
FIG. 4 is a view of the seat assembly frame structure with the frame for the lower seat portion moved forward to its cargo-carrying position and the seat back support portion tilted forward.

FIGS. 2, 3 and 4 show the brackets for supporting the head restraints. The brackets are seen at 30 and 32. Each bracket is provided with a pair of openings, one of which is designated at 34, for the purpose of receiving head restraint support shafts 36.

The brackets are mounted on an upper frame cross member 38. Left and right frame members 40 and 42, respectively, are joined to the transverse frame member 38. Preferably, the frame members 38, 40 and 42 are part of a continuous, tubular frame structure with three sides.

The lower end of frame side member 40 is pivoted at 20, as mentioned previously, to the base 12. The corresponding pivot for the right frame member 42 is shown at 44. Cross members 46 and 48 extend horizontally between the side members 40 and 42. These provide support for the upholstered material 22 seen in FIG. 1.

Upper frame member 38 and side members 40 and 42, as well as the frame for the lower seat portion, preferably are of lightweight tubular construction. The lower portions of the side members 40 and 42 are formed as flat rigid bars 50 and 52, respectively. These are of generally rectangular cross-section. The lower end of bar 50 is secured between side walls 54 and 56 of pivot bracket 58, as best seen in FIG. 4. A corresponding pivot bracket 60 with corresponding side walls is located at the right-hand side of the seat back support frame.

The lower seat portion comprises a frame having a forward tubular member 62 extending transversely from one side of the assembly to the other. It includes also left and right side members 64 and 66, respectively, which are joined to the forward member 62 to form a continuous frame structure. The rearward ends of the side members 64 and 66 are joined to a rear crossbar 68. Bar 68 is pivotally connected, as shown at 70, to the rearward end of the side member 64. A corresponding pivotal connection 72 is formed between the bar 68 and the side member 66.

One end of a first link 74 is connected pivotally at 76 to the forward end of the base 12. The other end of the link 74 is pivotally connected at 78 to an intermediate location on the side member 64.

The right-hand side of the seat assembly has a pivotal link 80, which corresponds to the pivotal link 74. One end of link 80 is pivotally connected at 82 to an intermediate portion of the side member 66, as best seen in FIG. 4. The other end of the link 80 is pivotally connected to base 16.

The forward frame member 62 may carry a pair of pedestals 84 and 86 for establishing a controlled if height of the frame for the lower seat portion when it is positioned as shown in FIG. 4 and when it is in its normal passenger-supporting position as shown in FIG. 2.

A crossbar 88 extends between the forward end of the bases 12 and 16. The link 74 is pivoted about the axis of the bar 88. Likewise, link 80 at the right-hand side of the seat assembly is pivoted on base 16 on the axis of the bar 88 at the right-hand side of the seat assembly.

The bracket 58 is formed with a locking surface 90 and with an abutment or stop 92. When the frame for the upright seat back portion is tilted about the axis at 20 to the upright position shown in FIG. 2, the end of the bar 68 at pivotal connection 70 engages the locking surface 90 and the abutment or stop engages the bar end, thereby limiting the pivotal movement of the upright seat back portion. Unwanted backward tilting motion of the seat back support portion is prevented in this fashion. Further, the rod end at 70, by reason of its engagement with the locking surface 90, will prevent forward tilting motion of the upright seat back portion about the axis 20 when the lower seat portion is in its fully retracted position shown in FIG. 2. At that time, the bar end becomes wedged between locking surface 90 and a cam surface on a bracket corresponding to bracket 106 at the right side of the seat assembly.

The bracket 106 at the right side of the seat assembly has a cam surface that is in juxtaposition with respect to a bracket adjacent to the bracket 58. The right end of the bar 68 engages a locking surface on bracket 60 and the cam surface on the bracket 106 in the same manner described with respect to the rod end at 70. The bracket 60 also has an abutment or stop that corresponds to the abutment 92 described previously with respect to the bracket 58.

The linkage arrangement and the caming and locking functions that occur at the right-hand side of the seat assembly are the same as the linkage arrangement and the caming and locking functions described with respect to the left-hand side of the seat assembly. A detailed description of the mode of operation of the elements at the right-hand side of the seat assembly, therefore, will not be repeated here.

Seen in FIGS. 3 and 4 is a pair of straps 94 and 96 which extend between the bar 88 and the bar 68. One end of strap 94 is secured by an eyelet bracket assembly 98 to the bar 88. Likewise, the left end of the strap 96 is secured by an eyelet bracket assembly 100 to the bar 88.

The right-hand ends of the straps 94 and 96 are secured to the bar 68 by eyelet bracket assemblies 102 and 104, respectively.

The straps 94 and 96 are formed of a spring fabric comprising woven, yieldable, synthetic threaded material that has spring properties. When the straps 94 and 96 are in the position shown in FIG. 3, the spring force of the straps is zero. When the frame for the lower seat portion is moved to the position shown in FIG. 2, spring straps 94 and 96 are stretched, and a tension force is created.

When the lower seat portion is in its fully latched position shown in FIG. 2, the line of action of the spring force in each strap is at or beyond an over-center position. That is, the plane that contains the axes of the crossbars 66 and 88 is essentially parallel to the direction of the force created by each spring strap. On the other hand, when the frame for the lower seat portion is in the position shown in FIG. 3 and is forced from the position shown in FIG. 3 toward the position shown in FIG. 2, the plane containing the axes of crossbars 68 and 88 is disposed obliquely with respect to the line of action of the spring strap forces. The spring straps thus provide a force moment that effects a yieldable resistance to movement of the frame for the lower seat portion from the position shown in FIG. 3 to the position shown in FIG. 2.

As the lower seat portion is guided into its seat back latching position, the spring straps will pop the cushion for the lower seat portion into the correct position for latching. This prevents false latching and ensures that the upright seat back support portion will be fully locked against unwanted movement forward about the pivotal axes at 20 and 44.

When the seat portion is being adjusted from the position shown in FIG. 4 to the position shown in FIG. 3, the frame for the lower seat portion is tilted upwardly, as indicated in FIG. 3, prior to the guiding action of bar 68 on the cam surface on bracket 106 toward the fully latched position. If the seat back support portion for some reason is not tilted at the correct angle and an attempt then is made to move the lower seat portion to the position shown in FIG. 2, the cushion for the lower seat portion will engage the cushion for the upright seat back support portion and will not pop into its fully latched position. This will alert the person who is making the seat adjustment that the seat back portion is not properly positioned. The forward frame portion 62 then can be raised so that the lower seat portion frame assumes a correct angle, as indicated in FIG. 3. The lower seat portion then can be popped into its fully latched position, thus preventing a false latch condition.

The seat frame construction of the invention eliminates the need for providing precise dimensional tolerances for the articulated members of the seat assembly, which are required in a design such as that of the copending application previously identified. A fully locked or latched condition of the lower seat frame with respect to the upper seat back support portion does not depend, in the design of the invention, upon elastic yielding of the structural members of the linkage system as in the case of the design of the copending application.

A preferred embodiment of the invention has an auxiliary platform 108 of generally rectangular profile extending between the right and left frame side members of the upright seat back support portion. It is hinged at its upper margin to the upper frame member 38. When the seat assembly is folded as shown in FIG. 4, the platform 108 can be folded over the head restraints to bridge any gap between the lower margin of the lower sat portion and the upper margin of the upright seat back support portion.

Although a particular embodiment of the invention has been disclosed, it is not intended that the disclosure is inclusive of all possible embodiments. A person skilled in the art may make modifications to the design disclosed without departing from the scope of the invention. The following claims are intended to cover all such modifications as well as equivalents thereof.

What is claimed is:

1. A foldable seat assembly for supporting a passenger in a passenger compartment of an automotive vehicle comprising a lower seat portion and an upright seat back portion, said passenger compartment having a fore-and-aft centerline, each seat portion having a rigid seat frame with cushion covers;

first and second seat assembly bases at transversely spaced locations relative to said centerline, said bases including means for securing them to floor structure of said passenger compartment;

the frame of said upright seat back portion having an upper frame member and two normally upright side members, the lower ends of said upright side frame members being pivoted on said bases;

the frame of said lower seat portion having a forward frame member and two frame side members;

a front crossbar extending transversely between the forward ends of said bases;

the frame of said lower seat portion having a rear crossbar extending between the lower frame side members;

a latch mechanism at the lower end of each of said upright side members including a locking surface engageable with said rear crossbar;

a cam surface at the rearward end of each of said bases;

pivotal connecting links between the forward ends of said bases and an intermediate location of said frame side members for said lower seat portion; and at least one spring acting between said front crossbar and said rear crossbar, said spring providing a yieldable resistance to movement of said frame of said lower seat portion to its normal passenger supporting position as said rear crossbar engages said locking surface and said cam surface to lock said upright seat back support portion against forward pivotal movement.

2. The seat assembly as set forth in claim 1 wherein said spring comprises a yieldable, woven fabric wherein the line of action of the force of said yieldable resistance, when the frame of said lower seat portion is in its passenger supporting position, is below said forward frame member whereby said lower seat portion is held in place in its passenger supporting position when said rear crossbar locks said upright seat back portion.

3. The seat assembly as set forth in claim 1 wherein said latch mechanism includes abutments carried by said upright frame side members and moveable therewith upon pivotal movement of said upright seat back portion;

said abutments limiting rearward pivotal motion of said upright seat back portion.

4. The seat assembly as set forth in claim 3 wherein said spring comprises a yieldable, woven fabric wherein the line of action of the force of said yieldable resistance, when the frame of said lower seat portion is in its passenger supporting position, is below said forward frame member whereby said lower seat portion is held in place in its passenger supporting position when said rear crossbar locks said upright seat back portion.

5. A foldable seat assembly for supporting a passenger in a passenger compartment of an automotive vehicle comprising a lower seat portion and an upright seat back portion, said passenger compartment having a fore-and-aft centerline, each seat portion having a rigid seat frame with cushion covers;

first and second seat assembly bases at transversely spaced locations relative to said centerline, said bases including means for securing them to floor structure of said passenger compartment;

the frame of said upright seat back portion having an upper frame member and two normally upright side members, the lower ends of said upright side frame members being pivoted on said bases;

the frame of said lower seat portion having a forward frame member and two frame side members;

a front crossbar extending transversely between the forward ends of said bases;

the frame of said lower seat portion having a rear crossbar extending between the lower frame side members;

a latch mechanism at the lower end of each of said upright side members, a locking surface engageable with said rear crossbar;

a cam surface at the rearward end of each of said bases;

pivotal connecting links between the forward ends of said bases and an intermediate location of said lower frame side members for said lower seat portion; and at least one spring acting between said front crossbar and said rear crossbar, said spring providing a yieldable resistance to movement of said frame of said lower seat portion to its normal passenger supporting position as said rear crossbar engages said locking surface and said cam surface to lock said upright seat back portion against forward pivotal movement;

said connecting links being pivoted on said bases for rotary movement between a forward position and a rearward position;

said frame of said lower seat portion, upon forward pivotal movement of said links, shifting the upper surface of said lower seat portion forward from its passenger supporting position to establish a cargo-carrying platform;

said upright seat back portion, when it is folded forward, establishing an extension of said cargo-carrying platform.

6. The seat assembly as set forth in claim 5 wherein said upright seat back portion includes an auxiliary platform extension pivoted on said upper frame member of said upright seat back portion frame;

said extension, upon pivotal forward movement of said upright seat back portion, forming a bridge surface between the cargo-carrying platform of said lower seat portion and said extension of said cargo-carrying platform.

* * * * *